July 10, 1934.                E. SCHEBERA                1,965,811
              ROOF EXTENSION FOR AN AUTOMOTIVE VEHICLE
                  Filed Sept. 16, 1931       3 Sheets-Sheet 1
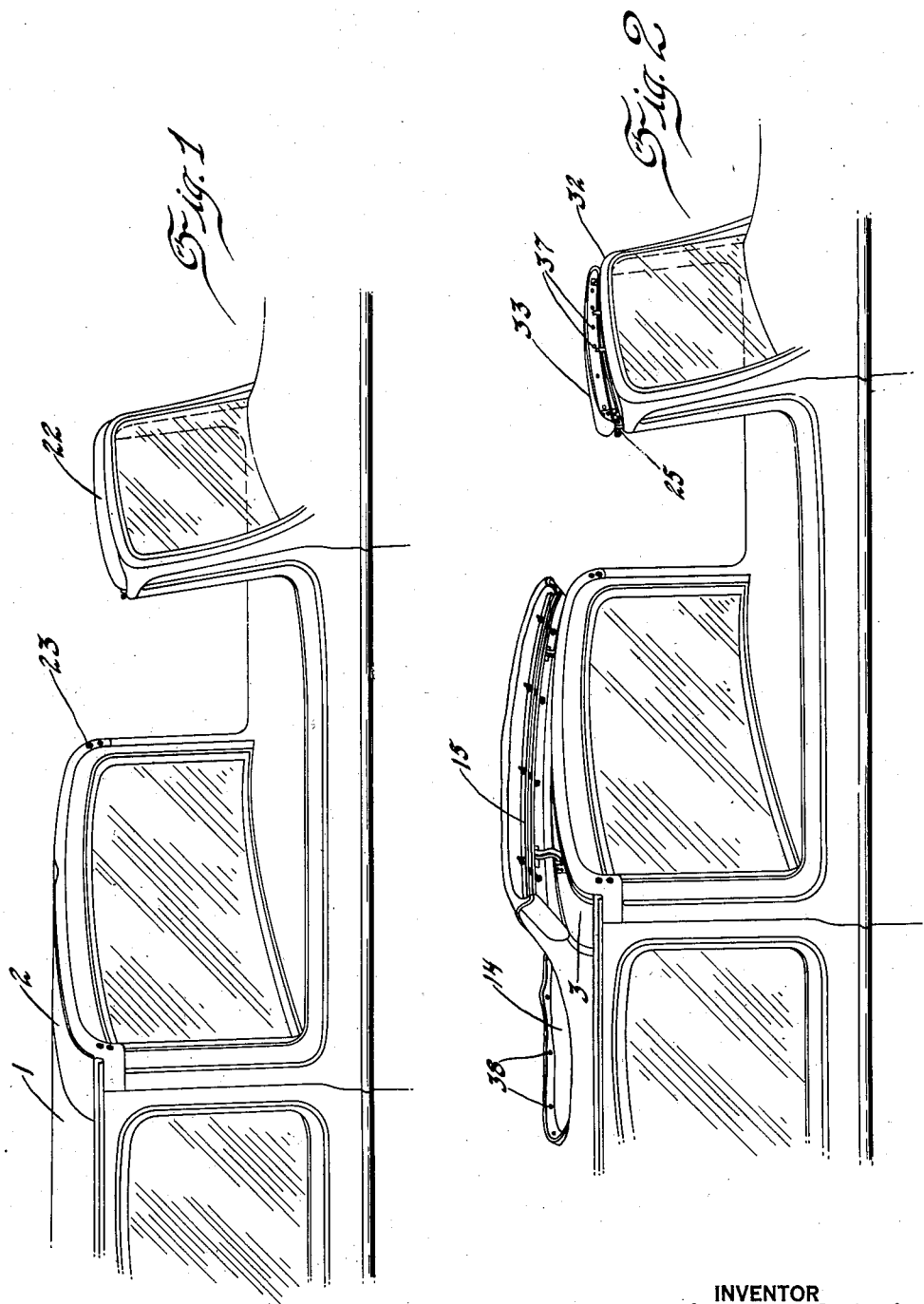
INVENTOR
*Ernst Schebera*
BY *Barnes & Kisselle*
ATTORNEYS

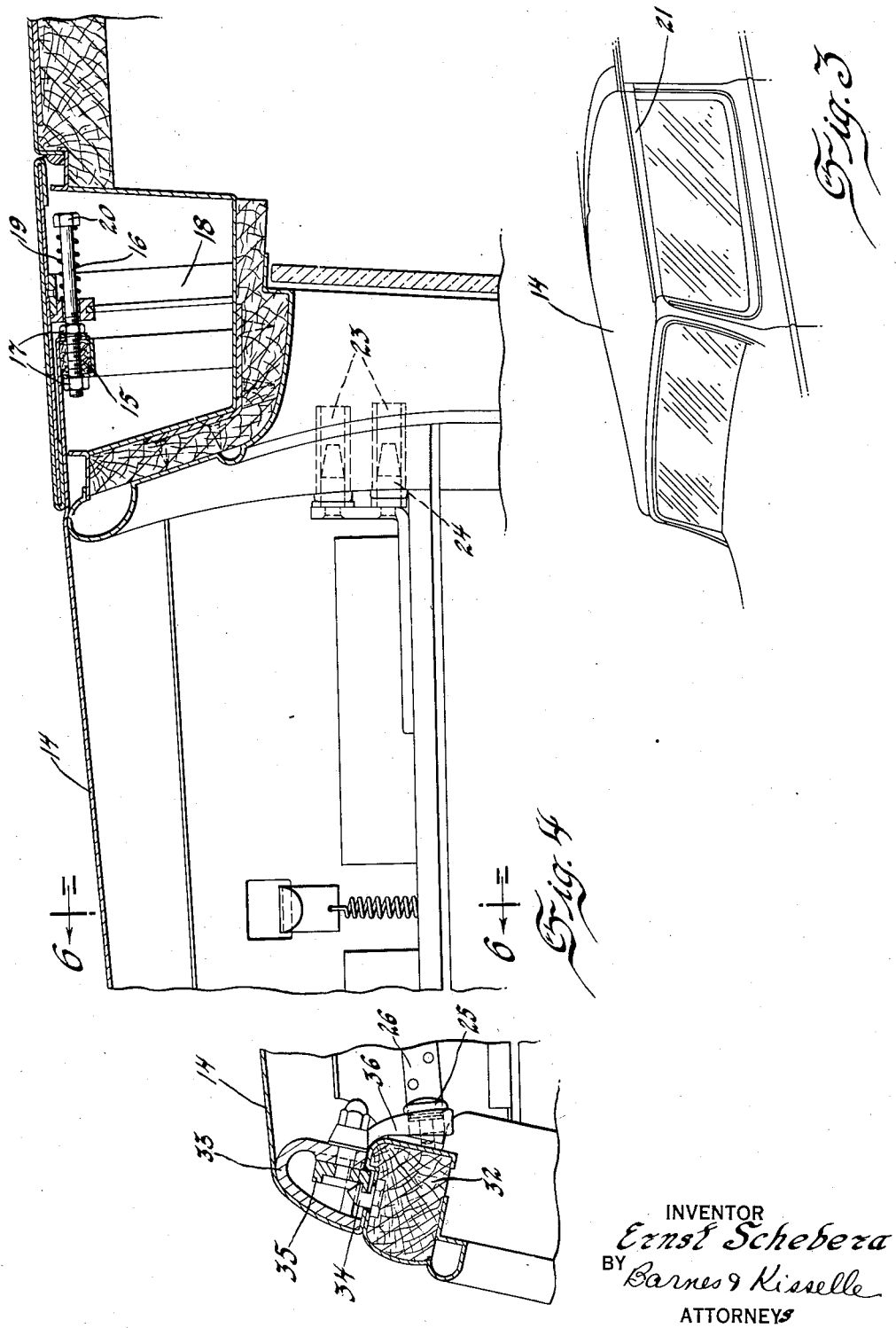

July 10, 1934.  E. SCHEBERA  1,965,811
ROOF EXTENSION FOR AN AUTOMOTIVE VEHICLE
Filed Sept. 16, 1931  3 Sheets-Sheet 3
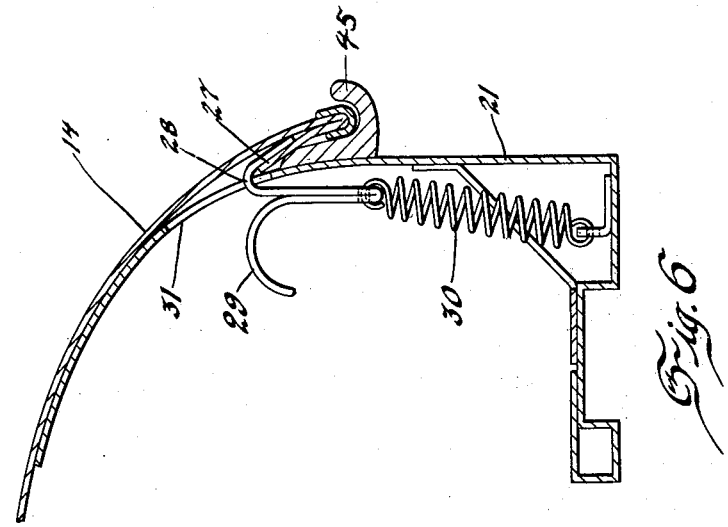
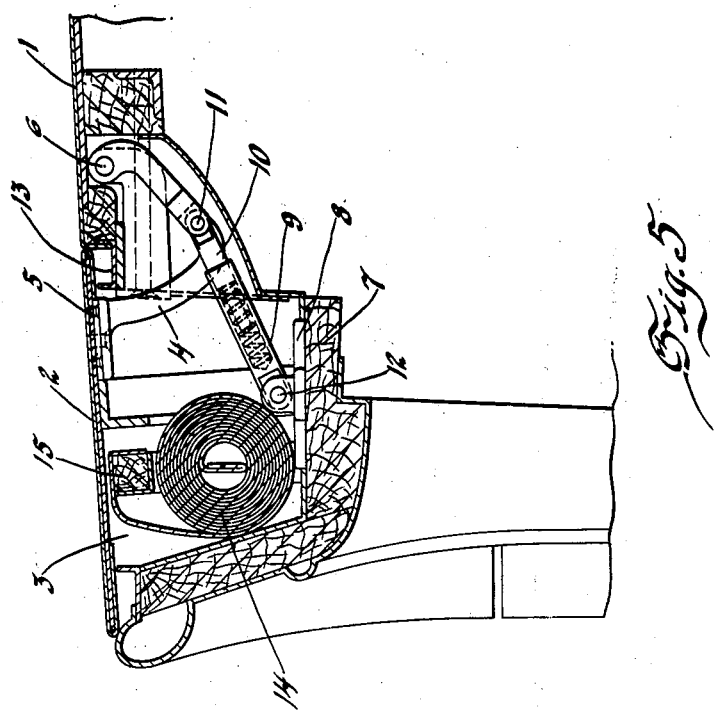
INVENTOR
*Ernst Schebera*
BY *Barnes & Kisselle*
ATTORNEYS Patented July 10, 1934

1,965,811

UNITED STATES PATENT OFFICE 1,965,811

ROOF EXTENSION FOR AN AUTOMOTIVE VEHICLE

Ernst Schebera, Detroit, Mich., assignor to Fleetwood Body Corporation, Detroit, Mich., a corporation of Pennsylvania Application September 16, 1931, Serial No. 563,156

8 Claims. (Cl. 296—99)

This invention relates to a roof extension for an automotive vehicle, or what is commonly known in the trade as a driver's roof.

Roof extensions of leather or fabricoid which are secured to the windshield header bar by any suitable fastening means such as the well known snap fasteners, or turn button fasteners are old in the art, but when the roof extension is removed, the fasteners remain exposed to view upon the windshield header bar and give a crude and unfinished effect to the header bar. It is an object of this invention to produce a roof extension which is secured to the header bar by fasteners which are concealed from view when the roof extension is removed, and this is achieved by making the header in two parts so that it can be opened or closed to expose or conceal the fasteners.

It is an object of this invention to produce a roof extension which is at all times tensioned so as to maintain the extension smooth and uncrinkled.

It is a further object of this invention to produce an automotive vehicle roof having a storage compartment for the roof extension and a hinged portion which serves as a lid for the compartment.

In the drawings:

Figure 1 is a perspective of the vehicle body with the roof extension removed and stored within the storage compartment.

Figure 2 is a perspective of the vehicle body showing the roof extension removed from the storage compartment and the windshield header opened preparatory to fastening the roof extension thereto.

Figure 3 shows the roof extension in operative position.

Figure 4 is a longitudinal section through the header bar, roof extension and the roof extension storage compartment.

Figure 5 is a section through the storage compartment of the roof extension showing the lid closed and the roof extension stored within the compartment.

Figure 6 is a section along the line 6—6 of Figure 4.

Referring more particularly to the drawings, there is shown a vehicle body having a permanent roof portion 1 and a roof extension 14. The forward portion 2 of the permanent roof is hinged to serve as a lid for the roof extension storage compartment 3. The spaced hinge arrangement of the lid 2 is brought out nicely in Figure 5, wherein it will be seen that the L-shaped hinge member 4 is fixed to the lid 2 as at 5, and pivotally mounted to the permanent roof portion 1 as at 6. Preferably, as shown in Figure 2, the lid is provided with two spaced hinge members. The bottom 7 of the storage compartment has mounted thereon the member 8 which has a pair of upstanding perforated ears between which is pivotally mounted as at 12 the hollow sleeve member 9. The sleeve member 9 has slidably mounted therein the spring pressed plunger 10 which is pivotally connected to the hinge member 4 as at 11.

It will be noted that when the lid is in closed position the pivot 11 is out of alignment with the pivot 6 and 12 whereby the spring pressed plunger 10 serves to maintain the lid 2 in closed position. When the lid 2 is raised the pivot 11 snaps to the other side of dead center and serves to yieldably hold the lid 2 in open position as shown in Figure 2. The forward edge of the permanent roof portion 1 is provided with the drip trough 13 which prevents any water that may pass between the rear edge of the lid 2 and the forward edge of the permanent top 1 from entering the storage compartment 3.

It is desirable to have the flexible roof extension 14, which may be of any suitable material such as leather or fabricoid, yieldably mounted so as to maintain it taut at all times when in operative position. To this end the rear edge of the top extension 14 is secured to the strip 15 by any suitable means. The strip 15 which is made of any suitable material such as wood, is provided with a plurality of perforations, each of which has secured therein a bolt 16. Each bolt 16 is locked to the strip 15 by the opposed nuts 17 positioned and drawn tight, one on each side of the rod 15. The lid 2 has fixed thereto the angle iron 18. The angle iron 18 is provided with a plurality of openings through which the free ends of the bolts 16 project. Coil springs 19 are passed over the free ends of the bolts 16 and held between the bolt heads 20 and the angle iron 18.

The driver's compartment is provided with a pair of side roof rails 21 which extend between the upper portion of the windshield header, generally designated 22, and the permanent roof portion. These side roof rails may be secured in position in any suitable manner such as by providing the permanent roof with a pair of sockets 23 which are adapted to receive the projecting dowels 24 which are mounted on the rear end of each roof rail 21. L-shaped brackets 26 are fastened to the front ends and within the roof rails 21; knurled thumb screws pass through these L-shaped brackets to fasten the roof rails to the windshield header bar.

Referring to Figure 6, it will be noted that the side edges of the roof portion 14 are provided with a return bent lip portion 27. The roof rails 21 have mounted on the inner side thereof a plurality of spaced coil springs 30 each of which carries a hook member 28 having a finger portion 29. The hook members 28 engage the lip 27 through openings 31 in the roof rail to place the same under a transverse tension and thereby maintain the roof taut and uncrinkled. By referring to Figure 4 it will be noted that the coil springs 19 acting through the bolts 16 and the rod 15 to which the roof extension 14 is secured, exert a lengthwise tension on the roof extension 14 which also assists in maintaining the roof taut and uncrinkled.

Referring to Figures 2 and 4 it will be noted that the windshield header bar comprises the lower portion 32 and the hinged upper portion 33. The lower portion 32 carries a pair of spaced keepers 34 which are adapted to be engaged by the rotary cam latches 35 carried by the upper member 33 and operated by the handles 36. The upper member 33 of the header bar carries the male member 37 of a plurality of snap fasteners which are adapted to interengage with the female members 38 carried by the forward edge of the roof extension 14.

In Figure 1 the vehicle body is shown with the roof extension disassembled and stored away in the storage compartment. It will be noted at this time that the windshield header 22 presents a finished appearance with the roof extension fastening members completely concealed. At this time, as brought out clearly in Figure 5, the roof extension 14 is rolled up and placed within the compartment 3. The compartment lid 2 is closed and is held in this position by the spring tension members acting on the hinge 4. It will be noted from Figure 1 that this lid 2 appears to be a portion of the permanent roof and completely camouflages the roof extension storage compartment.

If it is desired to place the roof extension in operative position, the lid 2 is swung into the position shown in Figure 2, and the extension 14 unrolled. The forward end of the extension, after the header bar 22 has been opened, is fastened to the top portion 33 by the snap fasteners. The top portion 33 is then hinged to closed position as shown in Figure 4 and the rotary cam latch bolts 35 are turned into latching engagement with the catches 34. When the top portion 33 of the header is hinged to closed position and latched, it clamps the roof extension to the header bar as shown in Figure 4, and hence, the roof extension is doubly secured to the windshield header bar since as above set forth, it is also secured thereto by the snap fastener arrangement.

It will be noted that when the hinged portion 33 of the windshield header is swung to latched position that the flexible roof extension 14 is drawn taut and the length of the roof extension is so gauged that preferably, at this time, the rod 15 is spaced somewhat from the support member 18 and the coil springs 19 placed under a tension. Thus, when the vehicle is in motion, body weave or relative movement between the roof portion and the header bar does not cause the roof extension 14 to crinkle because any slack is automatically taken up by the tensioned coil springs acting through the bolt 20 and rod 15. To further insure a smooth and uncrinkled roof extension, the spring catch members 28 are next projected through the openings 31 in the side roof rails and hooked into the lips 27 to place the roof under a further tension transversely thereof. Preferably when in operative position the spring catches 28 clear the bottom edges of the openings 31 and the longitudinal side edges of the roof extension 14 are spaced from the bottom of the drip trough 45. This permits the coil springs 30 in conjunction with the catches 28, to at all times maintain the roof extension 14 under a transverse tension.

I claim:

1. In a vehicle body, a roof and a roof extension, a compartment positioned beneath the said roof for storing the roof extension, only the portion of the said roof over the compartment being hinged transversely thereof along a transverse edge of the compartment to serve as a lid for closing the said compartment.

2. A vehicle body of the type having a flexible roof extension, an apertured roof rail, the flexible roof extension being in overlapping relation with the outer face of the roof rail, spring tension means mounted upon the inner face of the said roof rail and adapted to project through the said aperture to engage the flexible roof extension to maintain the same taut.

3. A vehicle body of the type having a flexible roof extension, a rigid coved roof rail having an aperture, the flexible roof extension being in overlapping relation with the outer face of the roof rail, and a hook and a coil spring mounted upon the inner face of the said roof rail, a lip extending along the longitudinal edge of the said roof extension and adapted to be engaged by the said coil spring hook to maintain the roof extension taut.

4. In a vehicle body of the type having the permanent roof portion and a flexible roof extension, a windshield header bar comprising a fixed portion and a portion hinged along its rear edge adapted to be opened and closed, the said flexible roof extension being drawn over and concealing the hinged portion of the header when in closed position, fastening means for the front edge of the roof extension secured to the inner face of the hinged portion of the said header bar whereby when the header bar is closed the fastening means are concealed.

5. In a vehicle body, a permanent roof portion, a flexible roof extension having a yieldable connection with the permanent roof portion, a header bar having a portion hinged along its rear edge, means for securing the roof extension to the hinged portion of the said header bar whereby when the said hinged portion of the header bar is hinged to closed position, the roof extension is drawn taut and placed under tension.

6. In a vehicle body having a permanent roof portion, a flexible roof extension, a windshield header bar comprising a fixed portion and a hinged portion having opposed normally concealed faces, the hinged portion being adapted to swing rearwardly when hinged to open position, fastening means carried by one of the concealed opposed faces of the portions of the header bar for securing the forward edge of the roof extension to the said header bar, the said roof extension being in overlapped relation with the outside surface of the hinged portion of the header whereby when the hinged portion is swung to closed position the roof extension will be drawn taut and clamped between the header portions.

7. In a vehicle body, the combination of a permanent roof portion, a header bar comprising a fixed portion and a hinged portion adapted to swing rearwardly to open position, the said fixed and hinged portions of the header bar having opposed faces, a flexible roof extension, yieldable means for securing the rear edge of the roof extension to the permanent roof portion, fastening means carried by the opposed face of the hinged portion of the header bar for fastening the forward edge of the flexible roof extension to the header bar when the hinged portion of the header bar is swung rearwardly to open position whereby when the hinged portion of the header bar is swung to closed position the forward edge of the roof extension is clamped between the hinged and fixed portions of the header bar and the yieldable means for securing the rear edge of the roof extension to the permanent roof portion is tensioned and the extension drawn taut.

8. In a vehicle body, a permanent roof portion, a flexible roof extension, a compartment extending beneath the front transverse edge of the permanent roof portion for storing the roof extension, only the portion of the permanent roof over the compartment being hinged to serve as a lid for closing the said compartment, and means for fastening the rear edge of the roof extension to the inside face of the said lid whereby the flexible roof extension may be rolled back upon itself to concealed position within the storage compartment beneath the lid.

ERNST SCHEBERA.